US012586053B2

(12) United States Patent
Palanisamy et al.

(10) Patent No.: US 12,586,053 B2
(45) Date of Patent: Mar. 24, 2026

(54) TWO-DIMENSIONAL CODE TRANSACTION PROCESSING COMMON GATEWAY

(71) Applicant: VISA INTERNATIONAL SERVICE ASSOCIATION, San Francisco, CA (US)

(72) Inventors: Karthikeyan Palanisamy, Singapore (SG); Robert Kevin Walls, London (GB); Nicolas D. Lee, Singapore (SG)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 542 days.

(21) Appl. No.: 17/309,625

(22) PCT Filed: Dec. 10, 2019

(86) PCT No.: PCT/US2019/065497
§ 371 (c)(1),
(2) Date: Jun. 10, 2021

(87) PCT Pub. No.: WO2020/123521
PCT Pub. Date: Jun. 18, 2020

(65) Prior Publication Data
US 2022/0027887 A1      Jan. 27, 2022

Related U.S. Application Data

(60) Provisional application No. 62/777,687, filed on Dec. 10, 2018.

(51) Int. Cl.
*G06Q 20/32*        (2012.01)
*G06Q 20/40*        (2012.01)

(52) U.S. Cl.
CPC ..... *G06Q 20/3276* (2013.01); *G06Q 20/4014* (2013.01); *G06Q 20/4016* (2013.01); *G06Q 20/405* (2013.01)

(58) Field of Classification Search
None
See application file for complete search history.

(56) References Cited

U.S. PATENT DOCUMENTS 10,002,268 B1 * 6/2018 Terra ..................... G07F 7/0833
11,455,858 B2 * 9/2022 Omojola ............ G06Q 20/3558
(Continued)

FOREIGN PATENT DOCUMENTS

CN        105264558 A      1/2016
CN        107181714        9/2017
(Continued)

OTHER PUBLICATIONS

Extended European Search Report for App. No. EP19894734.3, dated Nov. 5, 2021, 5 pages.
(Continued)

*Primary Examiner* — Chrystina E Zelaskiewicz
(74) *Attorney, Agent, or Firm* — K&L Gates LLP

(57)        ABSTRACT

Embodiments of the invention may provide a technical solution by creating an interoperable or common transaction payment gateway with two-dimensional code so that legacy two-dimensional code payment platform may communicate with the more robust transaction payment platform. Aspects of the invention design a handle message, instead of the typical actual transaction message, encoded in the two-dimensional code such that merchants or consumers may transmit such handle to be further processed or decoded by the transaction handler. An advantage of embodiments of the invention may no longer need the consumer or merchant to upgrade its existing device to interpret the two-dimensional code to retrieve the handle and may no longer need to upgrade its payment processing network infrastructure. Embodiments of the invention bridge a gap between the legacy close loop two-dimensional code infrastructure and
(Continued)

the robust and sophisticated payment transaction infrastructure.

15 Claims, 12 Drawing Sheets

(56)                    References Cited

U.S. PATENT DOCUMENTS

| 2012/0089471 | A1* | 4/2012 | Comparelli | G06Q 20/209 |
| | | | | 705/17 |
| 2014/0101036 | A1 | 4/2014 | Phillips et al. | |
| 2014/0372486 | A1* | 12/2014 | Bose | G06F 16/289 |
| | | | | 707/792 |
| 2015/0088674 | A1* | 3/2015 | Flurscheim | G06Q 20/326 |
| | | | | 705/17 |
| 2016/0065370 | A1* | 3/2016 | Le Saint | H04L 9/321 |
| | | | | 713/155 |
| 2016/0092874 | A1 | 3/2016 | O'Regan et al. | |
| 2016/0155112 | A1 | 6/2016 | Phillips et al. | |
| 2016/0191236 | A1* | 6/2016 | Smirnoff | H04L 9/0822 |
| | | | | 713/171 |
| 2018/0006821 | A1* | 1/2018 | Kinagi | H04W 12/61 |
| 2018/0285864 | A1 | 10/2018 | Dill et al. | |
| 2022/0012740 | A1* | 1/2022 | Bacastow | G06Q 20/322 |

FOREIGN PATENT DOCUMENTS

| CN | 107181714 A | 9/2017 |
| JP | 2016173752 A | 9/2016 |

OTHER PUBLICATIONS

Chinese Office Action and Search Report for corresponding Chinese Application No. 201980081787.X, dated Jun. 10, 2023 (English translation provided).

SG Written Opinion issued in App. No. SG11202105347Y, dated Nov. 7, 2022, 9 pages.

International Searching Authority, "Search Report," issued in connection with International Application No. PCT/US19/65497, dated Feb. 20, 2020, 2 pages.

International Searching Authority, "Written Opinion," issued in connection with International Application No. PCT/US19/65497, dated Feb. 20, 2020, 8 pages.

* cited by examiner

102

104

106

108-1

108-1

110

EXAMPLE
114
112

TWO-DIMENSIONAL CODE TRANSACTION PROCESSING COMMON GATEWAY

CROSS REFERENCE OF RELATED APPLICATIONS

The present application is a US national stage of a PCT international application, Serial no. PCT/US19/65497, filed on Dec. 10, 2019, which claims the priority to U.S. provisional patent application No. 62/777,687, filed on Dec. 10, 2018, the entire content of these applications are incorporated into the present application by reference herein.

TECHNICAL FIELD

Embodiments of the invention generally relate to providing a common processing gateway for two-dimensional code transaction processing.

BACKGROUND

Two-dimensional codes such as QR (Quick Response) codes or bar codes have been used to store information such that, once interpreted by an imaging device, the stored information may be retrieved. In one instance, the QR codes, which were first intended to be used in the automotive industry, have gained popularity in other industries, such as payment industries.

A QR code consists of black squares arranged in a grid, a square or a rectangular, on a white background. The grid is read or captured an imaging device such as a camera and processed using Reed-Solomon error correction until the image can be appropriately interpreted. The required data is then extracted from patterns that are designed by the party who designs the code in both horizontal and vertical components of the image. There are a number of models of the QR code design as shown in FIG. 1.

For example, a design 102 is treated as the original QR Code, a code capable of coding 1,167 numerals with its maximum version being 14 (73×73 modules). A design 104 may be an improvement over the design 102 so that this design may be read smoothly even if it is distorted in some way. The design 104 may be printed on a curved surface or whose reading images are distorted due to the reading angle can be read efficiently by referring to an alignment pattern embedded in them. This design 104 may encode up to 7,089 numerals with its maximum version being 40 (177×177 modules).

A design 106 may be consider as a micro QR code where there is only one position detection pattern, compared with the designs 102 and 104 that require a certain amount of area because position detection patterns are located at the three corners of the design. Furthermore, the design 102 or 104 requires at least a four-module wide margin around the design, whereas a two-module wide margin is enough for the design 106. The design 106 has a maximum side of 17×17 modules and may store up to 35 numerals.

Another variant is design 108, which may hold about 80% more information than the design 102 or 104. As such, the design 108 may be made 30% smaller as compared to the design 102 or 104. The design 108 may also form a rectangle shape 108-2, as shown in FIG. 1, or turned-over code, black-and-white inversion code or dot pattern code (not shown).

A design 110 may carry public data and private data. The private data may be read only with a dedicated reader having the cryptographic key. The design 110 has the same size as the design 102 or 104. Lastly, a design 112 incorporates an area or a frame 114 for holding an image.

These variant designs have also being popular with payment transactions where consumers and merchants use these to request or transmit payments. With the inclusion of a camera in almost every mobile device, using two-dimensional codes to initiate transactions are very popular.

Unfortunately, the implementations also lack interoperability. As can be seen from the various designs in FIG. 1, newer designs other than designs 102 and 104 attempt to store more data while using the same or less space required for design 102 or 104. This would require better or more accurate image capturing device and/or encryption or cryptographic implementation.

In addition, some of the payment platforms that enable such QR scanning are close loop and unable to provide the necessary data to communicate with other more sophisticated or robust payment platforms. In other words, the technical problem with the existing QR payment is that there is not enough data storage within the QR code designs to accommodate the demands and requirements to conduct transactions that are in compliance with EMV specification and requirements to ensure authenticity and security of the transaction.

Therefore, embodiments of the invention attempt to solve or address one or more of the technical problems identified above.

SUMMARY

Embodiments of the invention may provide a technical solution by creating an interoperable or common transaction payment gateway so that legacy QR payment platform may communicate with the more robust transaction payment platform. Aspects of the invention design a handle message, instead of the typical actual transaction message, encoded in the QR code such that merchants or consumers may transmit such handle to be further processed or decoded by the transaction handler. An advantage of embodiments of the invention may no longer need the consumer or merchant to upgrade its existing device to interpret the QR code to retrieve the handle and may no longer need to upgrade its payment processing network infrastructure. Embodiments of the invention bridge a gap between the legacy close loop QR infrastructure and the robust and sophisticated payment transaction infrastructure.

BRIEF DESCRIPTION OF THE DRAWINGS

Persons of ordinary skill in the art may appreciate that elements in the figures are illustrated for simplicity and clarity so not all connections and options have been shown to avoid obscuring the inventive aspects. For example, common but well-understood elements that are useful or necessary in a commercially feasible embodiment may often not be depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein may be defined with respect to their corresponding respective areas of inquiry and study except where specific meanings have otherwise been set forth herein.

DETAILED DESCRIPTION

The present invention may now be described more fully with reference to the accompanying drawings, which form a part hereof, and which show, by way of illustration, specific exemplary embodiments by which the invention may be practiced. These illustrations and exemplary embodiments may be presented with the understanding that the present disclosure is an exemplification of the principles of one or more inventions and may not be intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

Figure 2:
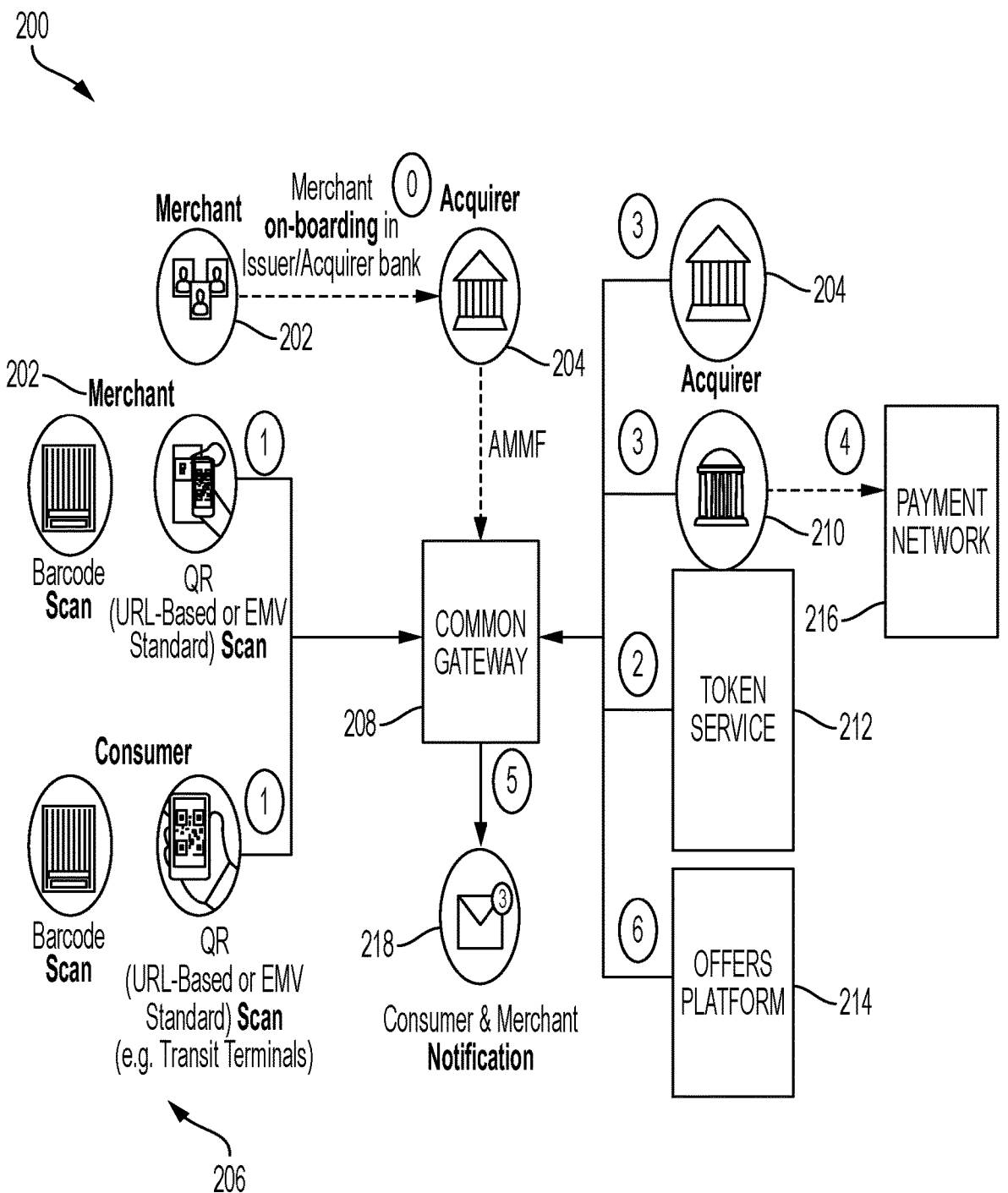
FIG. 2 is a system diagram according to an embodiment of the invention.

Referring now to FIG. 2, a diagram illustrates a system 200 of a two-dimensional code transaction payment common platform according to one embodiment of the invention. In one example, the system 200 may include a merchant 202 that may first register with an acquirer 204. For example, the merchant 202 may sign up to be a merchant to use the services of the acquirer 204 for the acquirer 204 to handle non-cash payment transactions. In another embodiment, a third-party to the merchant 202 or an agent of the merchant 202 may register the merchant 202 on behalf of the merchant 202 with the acquirer 204. For example, the third-party may be an aggregator who may provide a more efficient system than the merchant 202 in working with the acquirer 204. Once the merchant 202 is registered, the merchant 202 may possess the specifications for the merchant to generate a two-dimensional code to process payments regardless of what kind of two-dimensional code (e.g., barcodes, QR codes, etc.). In one example, the merchant 202 may generate the two-dimensional code in the point-of-sale (POS) to be scanned by a consumer or user. In another embodiment, the merchant 202 may configure the POS to include the specification according to the registration with the acquirer 204. In another embodiment, the acquirer 204 may preconfigure POS systems or devices for a particular merchant 202. In yet another embodiment, the POS of the merchant 202 may connected with the acquirer 204 via a wired or wireless network to receive updates and configurations from the acquirer 204 such that once the merchant 202 is registered with the acquirer 204, the POS device or system of the merchant 202 may automatically be updated with the configuration for the two-dimensional code common gateway.

The system 200 may also include a client portal 206 to interface with a consumer or user. For example, the client portal 206 may be an app or application installable on a mobile device of the user or consumer. In one embodiment, the client portal 206 register the user with the common two-dimensional code common gateway by associating one or more non-cash payment mechanisms of the user. In another embodiment, the client portal 206 may be a digital wallet application. In another embodiment, the client portal 206 maybe a browser installed on the mobile device of the user. In yet another embodiment, the client portal 206 may provide instructions to the mobile device to navigate to a website via a hyperlink or computer-executable link hosted by a server.

In another embodiment, the merchant 202 or the POS device of the merchant 202 may be a transit kiosk or terminal where the kiosk or terminal may read two-dimensional code for entry and exit for transit use cases with offline authentication capabilities and payment processing with consumer notification. In another embodiment, the merchant 202 or the consumer may present two-dimensional code for specific uses. In another example, the two-dimensional code may not be for transactions or payments. Instead the two-dimensional code may include URL for informational purposes or instructions once executed in a controlled environment, another application or apps may be executed. Aspects of the invention with the system 200 having the common gateway 208 may provide interoperability solution to all these use situations. Moreover, the common gateway 208 may enable another kind of two-dimensional code, the barcode, to act as a payment acceptance method as well.

In one example, when the user may be ready to make a transaction with the merchant 202, the merchant 202 may generate a two-dimensional code, such as a barcode or QR code for the user to scan. The user may use a camera that comes with his or her mobile device to scan the two-dimensional code so that the client portal 206 may interpret a message embedded in the two-dimensional code. In another embodiment, the client portal 206 may also produce a two-dimensional code to be scanned by the POS device or system of the merchant 202.

Either from the merchant 202 or the client portal 206, the encoded message as interpreted from the two-dimensional code may be sent to a common gateway 208. In one embodiment, the encoded message may be a handle message that is to be further decoded by the common gateway 208 to derive at a payload for the transaction. For example, the following table (Table 1) provides a base data payload example:

TABLE 1

| Data Object | ID | Format | Example Value |
|---|---|---|---|
| Payload Format Indicator | "00" | N | "01" |
| Merchant Account Information | "02" | ans | "4000123456789012" |

TABLE 1-continued

| Data Object | ID | Format | Example Value |
|---|---|---|---|
| Merchant Category Code | "52" | N | "5251" |
| Transaction Currency | "53" | N | "840" |
| Country Code | "58" | ans | "US" |
| Merchant Name | "59" | ans | "ABC Hammers" |
| Merchant City | "60" | ans | "New York" |
| Cyclic Redundancy Check (CRC) | "63" | ans | Calculated using the algorithm defined in [EMV MERCHANT QR] |

In one embodiment, Table 1 illustrates one example of the an EMV QR data payload when a merchant presents a QR code to be scanned by the user.

On the other hand, in one embodiment, the user may also provide a QR code to be read by the merchant. The following table (Table 2) provides a base data payload example:

TABLE 2

| Tag | Value | Length | Format | Presence: Mandatory (M); Optional (O) |
|---|---|---|---|---|
| '85' | Payload Format Indicator | 5 | an | M |
| '61' | Application Template | var. | b | M |
| 'xxxx' | Additional BER-TLV coded data objects | var. | b | O |
| '63' | Application Specific Transparent Template | var. | b | O |
| 'xxxx' | Additional BER-TLV coded data objects | var. | b | O |
| '61' | Application Template | var. | b | O |
| 'xxxx' | Additional BER-TLV coded data objects | var. | b | O |
| '63' | Application Specific Transparent Template | var. | b | O |

TABLE 2-continued

| Tag | Value | Length | Format | Presence: Mandatory (M); Optional (O) |
|---|---|---|---|---|
| 'xxxx' | Additional BER-TLV coded data objects | var. | b | O |
| '62' | Common Data Template | var. | b | O |
| 'xxxx' | Additional BER-TLV coded data objects | var. | b | O |
| '64' | Common Data Transparent Template | var. | b | O |
| 'xxxx' | Additional BER-TLV coded data objects | var. | b | O |
| 'xx' | Other template | var | b | O |
| 'yy' | Another template or primitive data object | var | b | O |

As such, prior approaches attempt to embed or encode these two data payload directly using the two-dimensional code, such as QR codes. The technical problem with such approach is that it leaves out the legacy approaches that may not be able to encode the data payload described above.

Figure 1:
FIG. 1 one or more existing designs of QR codes.
Figure 1:
Figure 1:
Figure 1:
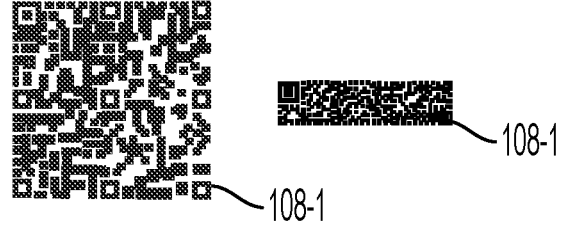
Figure 1:
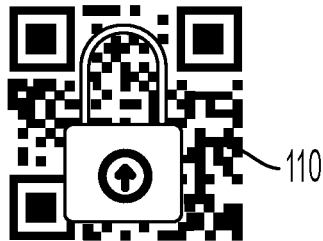
Figure 1:
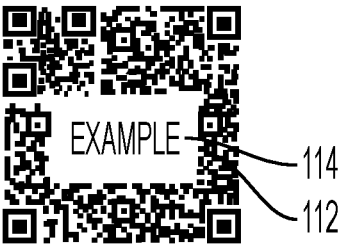
Figure 3:
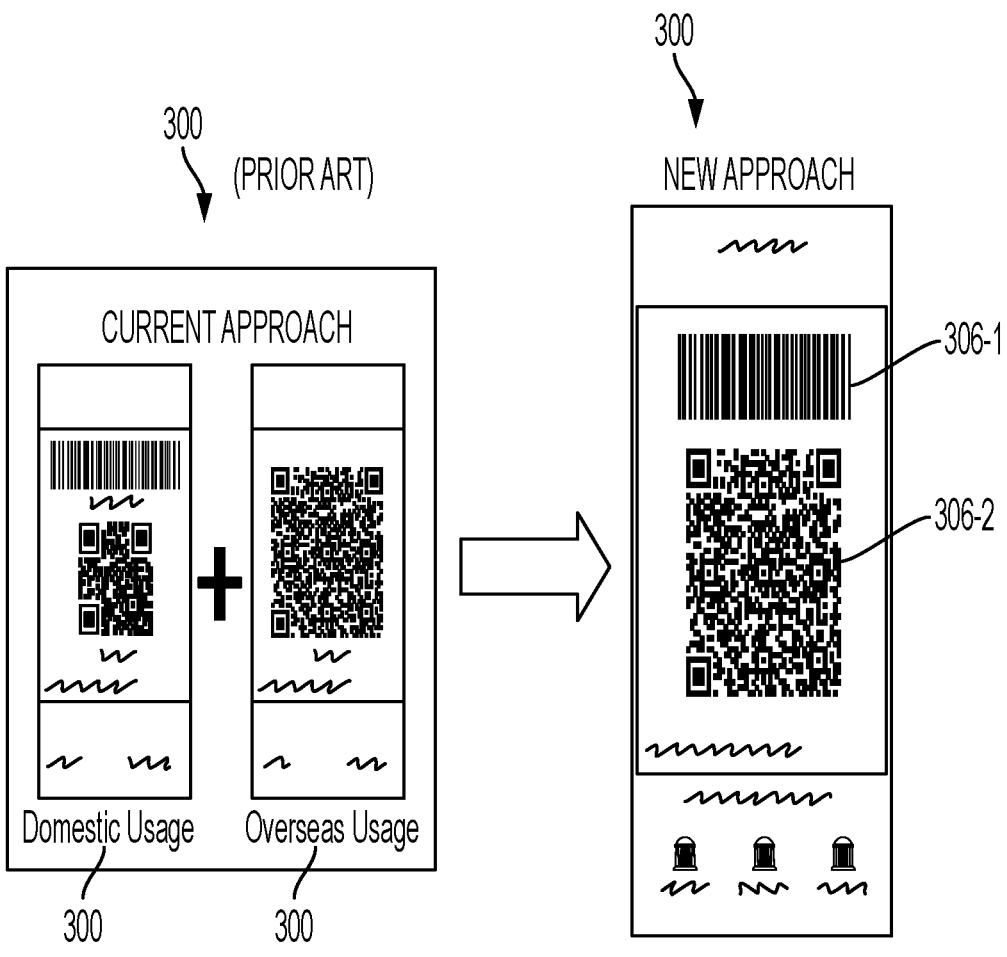
FIG. 3 is a diagram illustrating differences between prior approaches and aspects of the invention.

Moreover, in another shortcomings as see in FIG. 3, a prior system 300 would generate two sets of codes: one for domestic use 302 and the other one for overseas usage 304. As previously illustrated in FIG. 1, the domestic usage code 302 provides less data capacity while the overseas usage code 304 holds more data.

Embodiments of the invention propose new solutions to enable one set of code that may be in the form of a barcode 306-1 or a QR code 306-2. Moreover, instead of encode the data payload to satisfy a given transaction as shown in tables 1 and 2 above, embodiments of the invention provide a new handle format such that the common gateway 208 may translate and expand the handle message to the data payload needed to process the transaction.

Referring now back to FIG. 2, the acquirer 204, a payment processor 210, a token service 212, and an offers platform 214 may further provide services to the common gateway 208. In one embodiment, the acquirer 204, the payment processor 210, or the token service 212 may discuss one or more of the following terms and their brief descriptions thereof in Table 3:

TABLE 3

| Term | Description |
|---|---|
| Token | A Token is a "non-financial identifier" that can be used as a substitute to the original payment credentials (PAN) and may be used in its stead to initiate, authorize, settle or resolve a payment transaction or represent the original credential in other systems where the original credential needs to be referred. |
| FPANID | Funding Primary Account Number (PAN) or Cardholder Account Number. |
| Primary TSP | Business entity who is responsible to facilitate the token request from wallet provide, responsible for all the issuer interaction and ID&V with issuers |
| Processor PP - Processor Provisioning proxy | Processor's service specifically developed to support Japan Apple Pay implementation. |
| Primary FPAN Reference ID | PAN Reference issued by Primary |
| Secondary FPAN Reference ID | In this case, Its Processor issued PAN Reference ID |
| DPAN ID | Processor Token Identifier - Digital PAN |
| M-QR | Merchant presented QR Transaction |

TABLE 3-continued

| Term | Description |
| --- | --- |
| C-QR | Consumer presented QR Transaction |
| BAR | BAR Code based transaction |
| TR-TSP | Token Requestor - Token Service Provider |
| I-TSP | Issuer - Token Service Provider |
| BAR | BAR Code based transaction |

In one embodiment, the common gateway 208 may also be network-connected to a notification service 218. Moreover, the payment processor 210 may further be network-connected to a payment network 216.

Figure 4A:
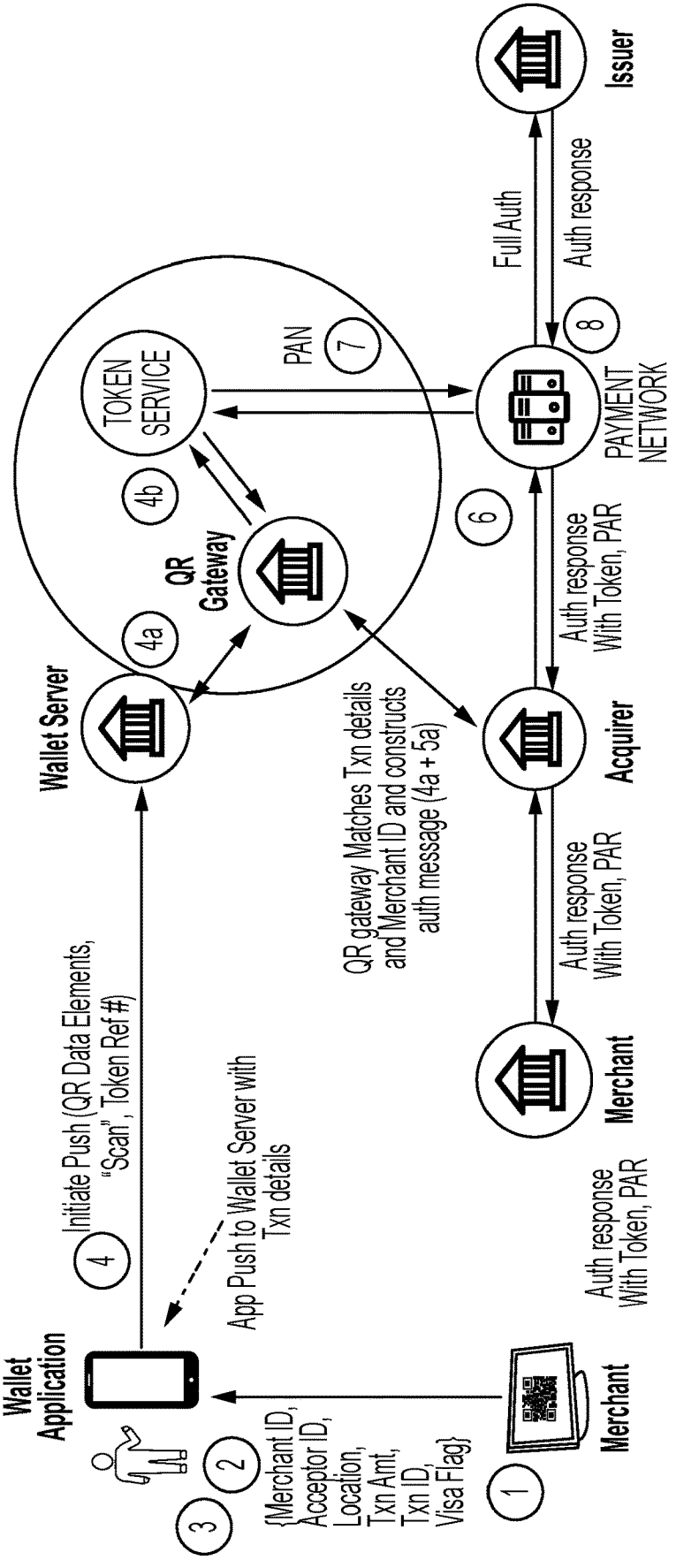
FIGS. 4A to 4B are diagrams illustrating uses of aspects of the invention.
Figure 4B:
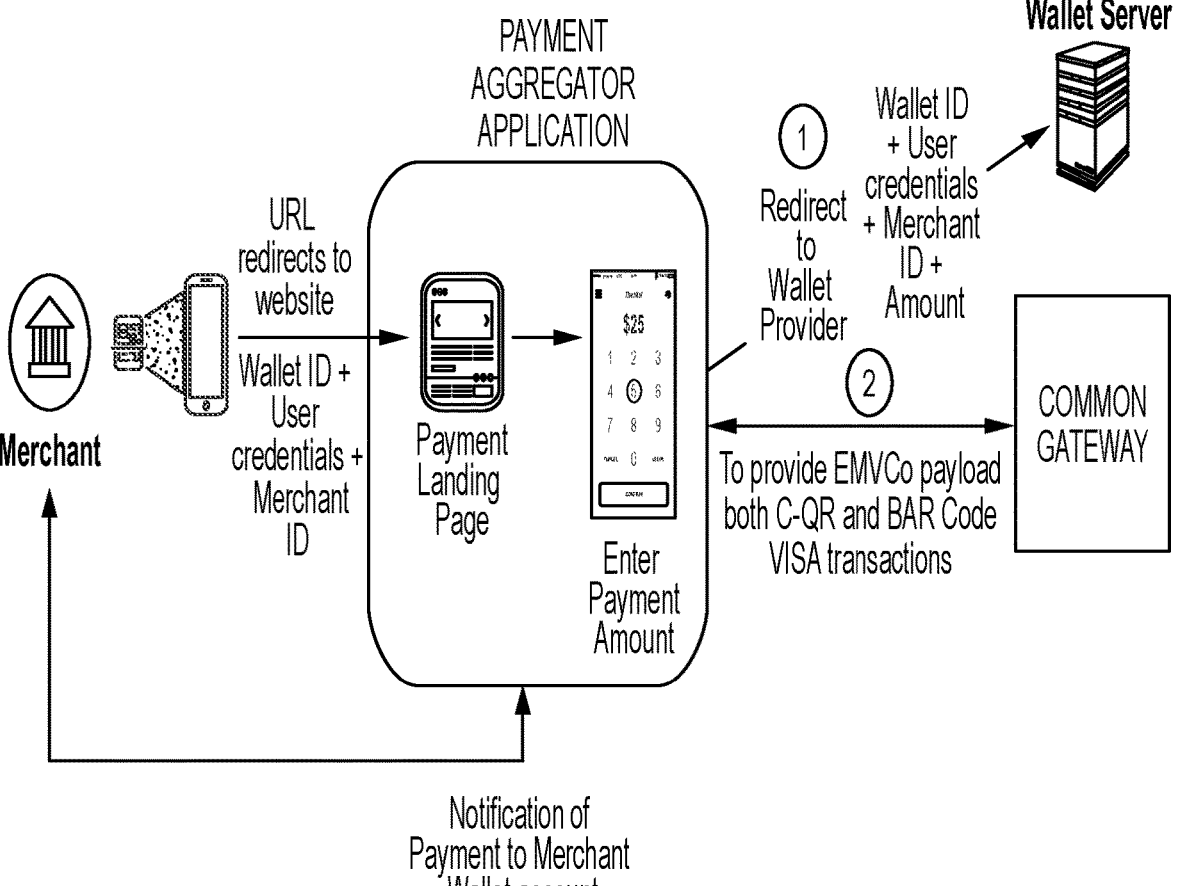

To further illustrate use example, FIGS. 4A to 4B are diagrams illustrating uses of aspects of the invention. In one example, a user or consumer may be at a POS device of a merchant, such as the merchant 202, to make a transaction. The merchant may provide a two-dimensional code to the user for the two-dimensional code to be scanned. In one embodiment, the merchant has already registered with an acquirer such that the information of the merchant is already stored and maybe verified at a later time.

In response to this registration, the two-dimensional code generated from the merchant may include a first part or a portion of a handle message. In one embodiment, the first part or portion of the handle message may include data of: a merchant ID, an acceptor ID, a location, a transaction amount, a transaction ID, and a processor flag or a flag. In one embodiment, the first part or portion of the handle message may be tokenized.

Once presented with the two-dimensional code, the user may user a client portal installed on the user device. In one embodiment, the client portal may be a wallet application, a browser, or a payment application. In another embodiment, the wallet application, the browser, or the payment application may have access to payment accounts of the user.

In one example, the user may use the client portal to activate an imaging device, such as a camera of the user device, to scan the two-dimensional code. The client portal may next interpret the two-dimensional code to decode or detokenize the first part of the handle message. In another embodiment, the client portal may transmit the two-dimensional code as an image without processing to a client portal server so that the client portal server may perform the decoding. In another embodiment, once the decoding is completed, whether it is done with the client portal or the client portal server, payment information of the user may be added as a second part of the handle message. The client portal may then push the first part and the second part of the handle message to the client portal server (e.g., no further user interaction before the handle message arrives at the client portal server). In one embodiment, the client portal server may include the client ID or wallet ID as the second part of the message.

In one embodiment, the first part and the second part of the handle message may be sent to or received at the common gateway. The common gateway may be hosted or supported by one or more servers. In another embodiment, the one or more servers may host or support the common gateway as a cloud service solution. The first part of the handle message may be verified the acquirer, after receiving from the common gateway. Once verified, the acquirer may transmit the handle message back to the common gateway so that the common gateway may identify the payment information after it is verified by the client portal server.

Once the common gateway may identify the payment information, the common gateway may transmit the payment information to an issuer for payment to the merchant.

In one embodiment, the common gateway, after detokenize the first part and the second part of the handle message, generates a transaction data packet that is in compliance with a given data payload to process non-cash transactions. For example, the common gateway may generate the full data payload, per specification as detailed in Tables 1 and 2. As such, aspects of the invention provide a bridge between the legacy system that could not generate or include two-dimensional code with robust information and the newer and more robust system.

In one embodiment, a "closed" loop payment system as used in the prior art involves the funds being "available" in the wallet. In other words, the wallet includes an account for holding funds transferred or deposited by the user to a wallet account. As such, when payment is needed, the wallet application may direct the merchant to the wallet account to retrieve payments. Hence, it is considered a "closed" loop situation because the communications/transactions are between the merchant and the wallet. There was no need to leave the wallet. However, such system deprives the user of using other non-cash payments via the wallet because the merchant's system is unable to recognize or cooperate with other non-cash payment accounts' tokenization, authentication, or security systems. As such, unless the user constantly loads funds to the wallet in advance, the user would not be able to enjoy other non-cash payment accounts or mechanisms' benefits.

In another embodiment, FIG. 4B illustrates a further example of embodiments of the invention. Similar to FIG. 4A, a merchant may present a two-dimensional code to a user and the user may use its user device to scan the two-dimensional code. In one embodiment, the user may further use a wallet application to perform the interpretation of the two-dimensional code to derive at the handle message. Instead of pushing the handle message to a client portal server, the wallet application may navigate the user to a payment landing page where the handle may include a wallet ID, a user credentials and a merchant ID. In another embodiment, the payment landing page may further enable the user to enter via the user device, the amount of transaction, including a currency information. In another embodiment, the payment landing page may be hosted by a payment aggregator application that may be remote to or installed on the user device.

In another embodiment, after providing such transaction amount, the payment aggregator application may transmit the handle message to the wallet or the client portal server or may transmit the handle message to the common gateway for payment processing.

Figure 5:
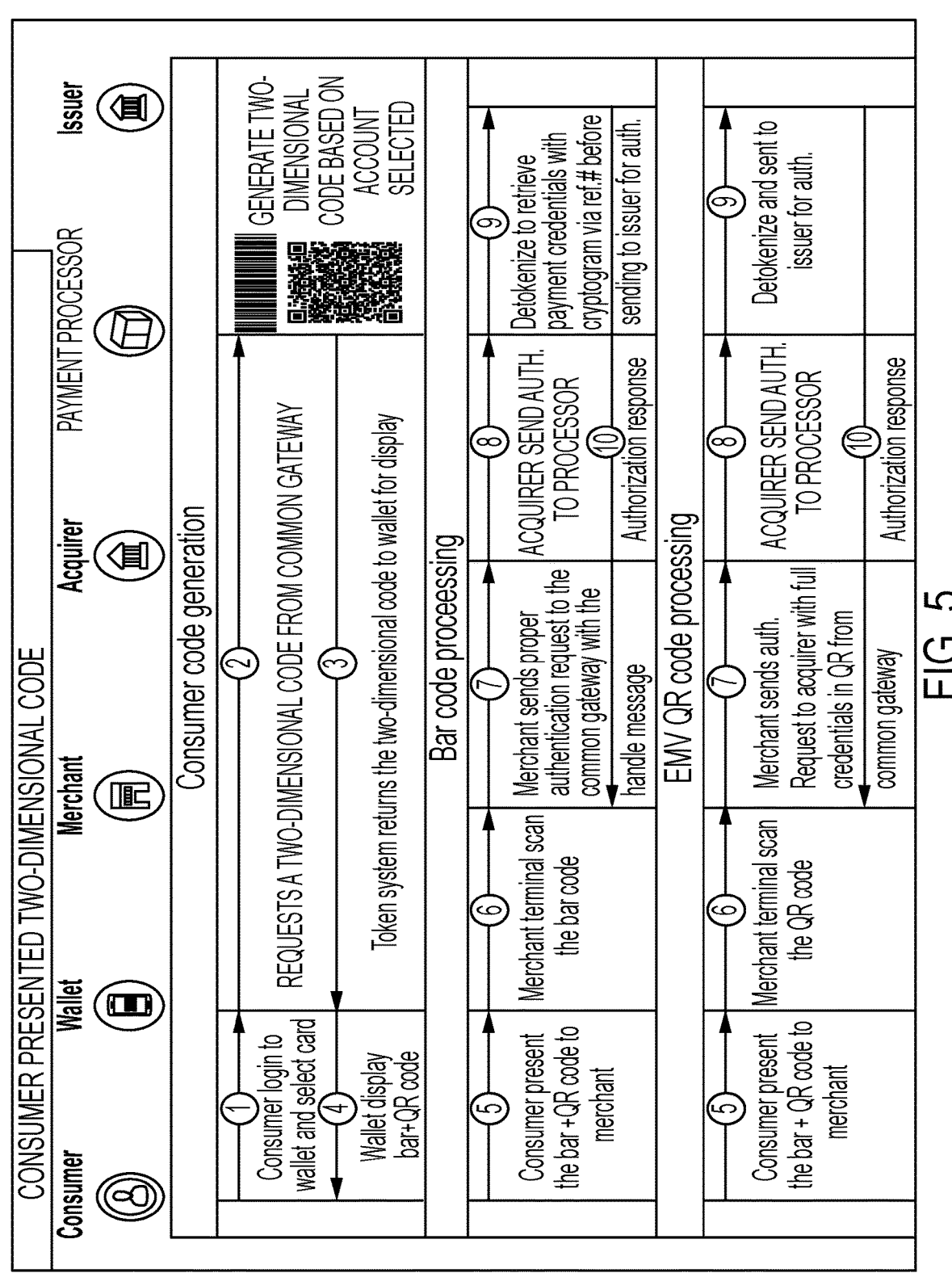
FIG. 5 is a diagram illustrating user or consumer generated two-dimensional code according to one embodiment of the invention.

FIG. 5 is a diagram illustrating user or consumer generated two-dimensional code according to one embodiment of the invention. In one embodiment, the user device of the consumer may provide a two-dimensional code. For example, the user device may include a wallet application that may enable user to store one or more non-cash payment accounts. In this example, after the user logs into the wallet application, the user may be provided with an option to choose one or more of the payment accounts. In one embodiment, the user may have configure a payment account to be a default account. In such an instance, the default account may be used.

The wallet application may request a two-dimensional code from the common gateway. The common gateway may communicate with a token service and return the two-dimensional code to the wallet for display. In one embodiment, the common gateway may encode the handle message as discussed in previous examples.

The user may present the two-dimensional code to the merchant for payment to the merchant. The merchant, via its imaging device, scans the two-dimensional code. In this example, there may be different processing approach to two different kinds of two-dimensional code. In one embodiment, where the merchant only recognizes a barcode, the merchant may send a proper authentication request to the common gateway with the handle message. The acquirer, after receiving the request from the common gateway, may send authentication to payment processor. The processor may detokenize the handle message to identify the payment credentials before request the issuer for payment.

In another embodiment, wherein the merchant's imaging device recognizes the QR code in the two-dimensional code, the merchant may send a proper authentication request to the common gateway with the handle message. The acquirer, after receiving the request from the common gateway, may send authentication to payment processor. The processor may detokenize the handle message to identify the payment credentials before request the issuer for payment.

Figure 6A:
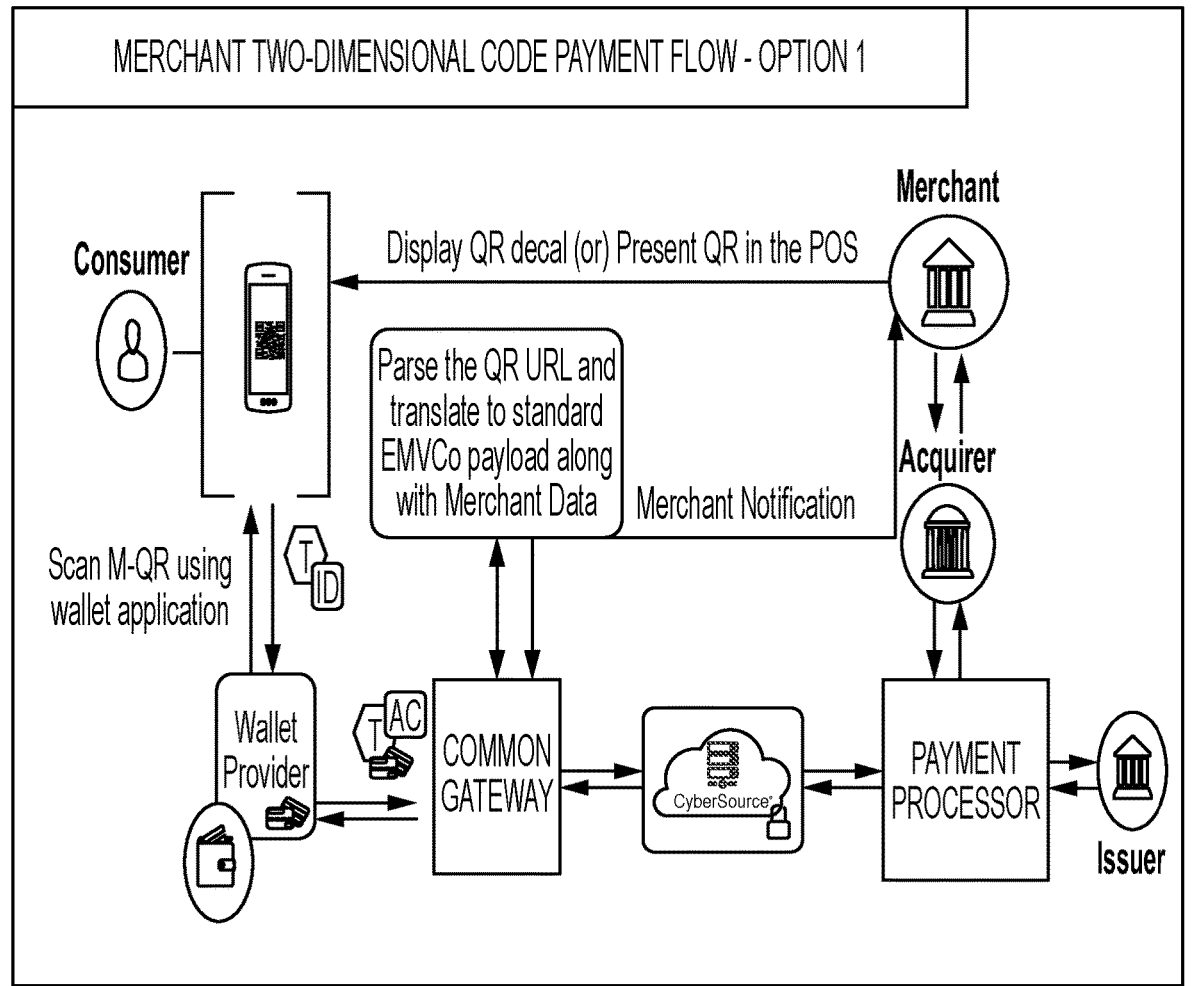
FIGS. 6A to 6C are diagrams illustrating payment flows according to embodiments of the invention.
Figure 6B:
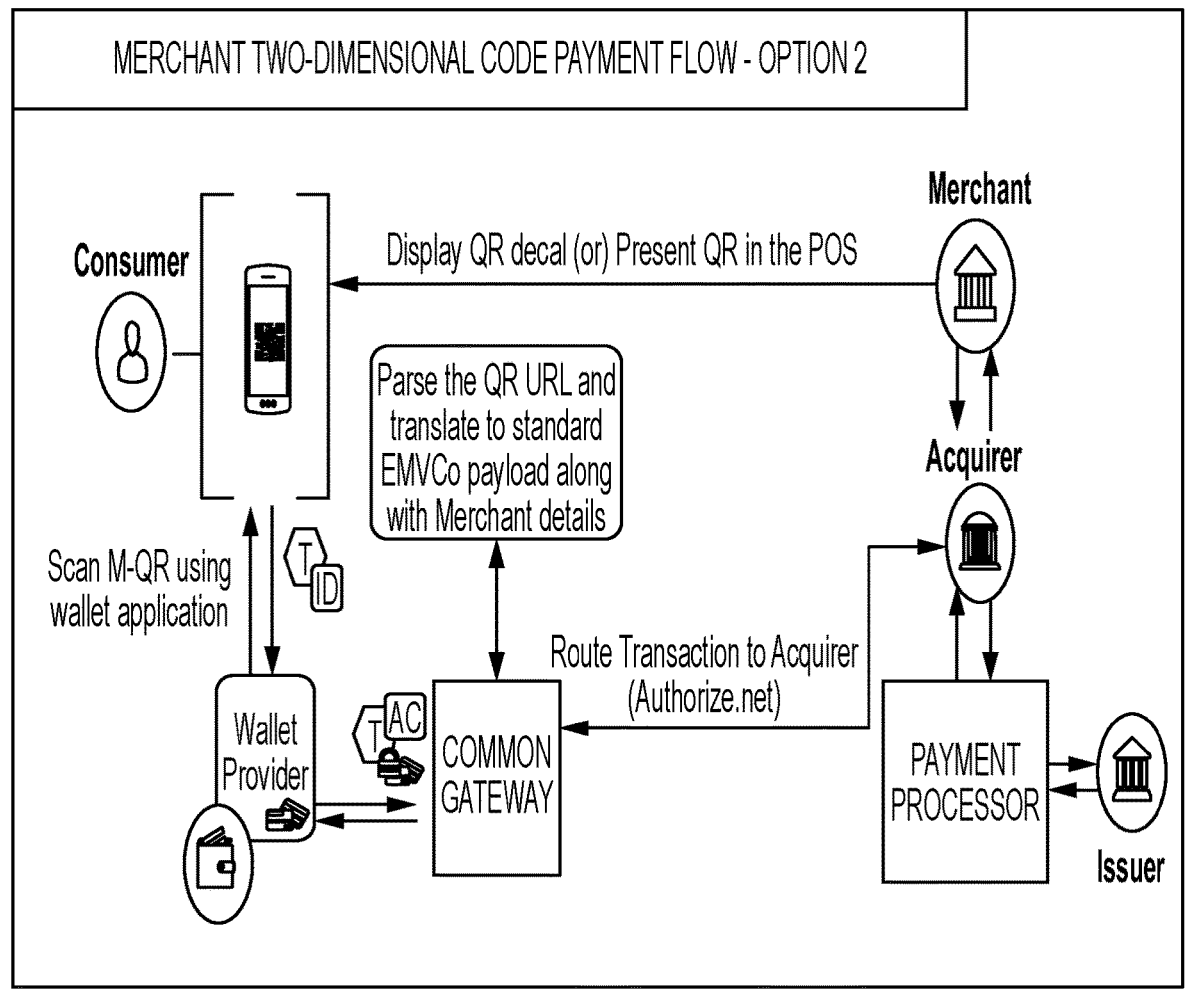
Figure 6C:
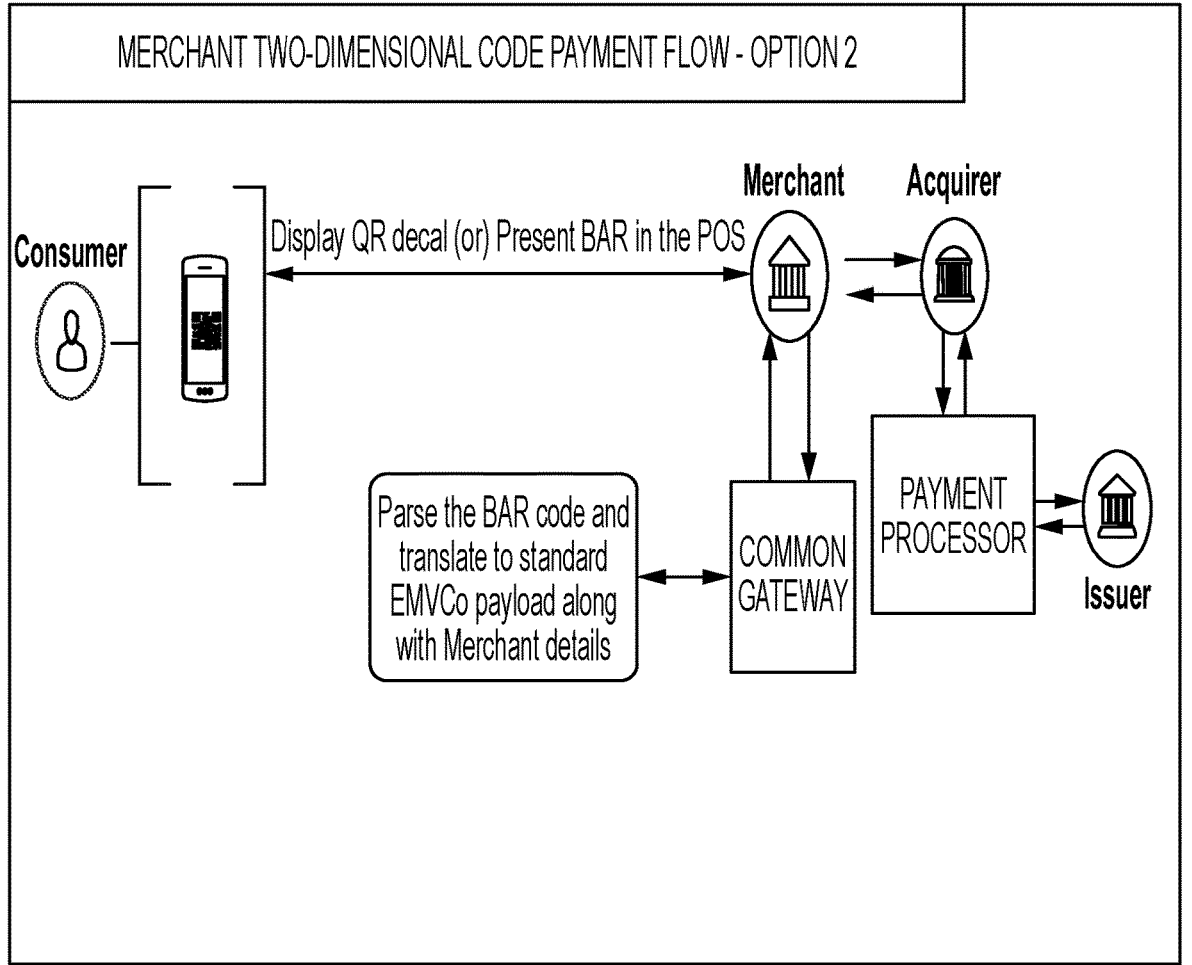

FIGS. 6A to 6C further illustrate diagrams of payment flows according to embodiments of the invention as exemplified in above descriptions.

In another embodiment, the following tables further describe parameters that may be included as part of the data payload for processing. For example, Table 4 bellow illustrate parameters or considerations of the common gateway in one embodiment:

TABLE 4

| Req # | Description/Statement | Model Reference | Priority | Dependency |
|---|---|---|---|---|
| QR_BR_1 | Leverage EMVCo tokenization principles for QR Transactions (standards based approach) | | | |
| QR_BR_2 | Allow Wallet providers/issuer/acquirer/merchant - use two-dimensional code common gateway QR programs following Processor standards | | | |
| QR_BR_3 | Support OCT/P2P programs for non terminalized markets | | | |
| QR_BR_4 | Support Data Routing to Acquirers/ Payment Gateway/Processing Network | | | |
| QR_BR_5 | Develop a Processor common QR gateway standard that allows wallet providers, merchant/acquirers or relevant ecosystem partner to implement a compliant QR Gateway | | | |
| QR_BR_6 | Develop a Processor common QR Gateway that can be offered as a service to perform all types of QR and BAR code transaction | | | |

Table 5 below may include one or more parameters for inclusion in the tokenization process in one embodiment:

TABLE 5

| Req # | Description/Statement | Stakeholder Reference | Priority | Dependency |
|---|---|---|---|---|
| MER_PRV_1 | Token may have new indicator or type flag to indicate presentation mode of Scan or Merchant QR | | Shall | |
| MER_PRV_2 | Token for QR/BAR may be CBP token type | | Shall | |
| MER_PRV_3 | Token for QR/BAR may be configured for domain controls with new POS EM | | Shall | |
| MER_PRV_4 | Single may be used for M/C QR and BAR code use case | | Shall | |

Table 6 below may include further specification about the common gateway in one embodiment:

TABLE 6

| Req # | Description/Statement | Stakeholder Reference | Priority | Dependency |
|---|---|---|---|---|
| QR_GAT_1 | two-dimensional code common gateway may have functionality to connect to a token system or other token system provider's to retrieve token | | Shall | |
| QR_GAT_2 | two-dimensional code common gateway may be operated by Processor, a token system provider, an acquirer, a processor or an approved Processor entity | | Shall | |
| QR_GAT_3 | two-dimensional code common gateway may have functionality to initiate or 'push' an Authorization Message to an Acquirer | | Shall | |
| QR_GAT_4 | two-dimensional code common gateway may support multiple interfaces/connections to various token system provider's/Networks | | Shall | |
| QR_GAT_5 | two-dimensional code common gateway may have functionality to support 'tentative authorization' flows. | | Shall | |
| QR_GAT_6 | two-dimensional code common gateway may have functionality to support connectivity to Wallet providers | | Shall | |
| QR_GAT_7 | two-dimensional code common gateway may have logic to match transaction/merchant details between wallet provider request and from acquirers that a requesting the token. | | Shall | |
| QR_GAT_8 | two-dimensional code common gateway may only construct the authorization with the retrieved token after it has fully matched the Mobile App token requestor details to the incoming merchant transaction | | Shall | |
| QR_GAT_9 | two-dimensional code common gateway may only push the authorization after it has fully matched the transaction/merchant details after processing the merchant/transaction details from the Mobile App and the tentative authorization from the merchant | | Shall | |
| QR_GAT_10 | two-dimensional code common gateway may be compliant Processor Physical and Logical security requirements | | Shall | |

Table 7 below may include additional security consider-
ations as part of the implementation of the common gateway
in one embodiment:

TABLE 7

| Req# | Description |
|---|---|
| NF-SEC-01 | Compliance with applicable Apple and Processor Technical Security Requirements<br>API may be fully compliant with all applicable Processor Technical Security requirements as prescribed by Processor's Global Information Security group. |

TABLE 7-continued

| Req# | Description |
|---|---|
| NF-SEC-02 | Vulnerability Assessment<br>API interface components may be subjected to a periodic vulnerability assessment. All High and Medium findings may be remediated without exception before connecting into a token system production environment. |
| NF-SEC-04 | Secured Communication<br>All communication between payment processing and Processor systems may be secured as prescribed by Global Information Security policy for system connectivity and communication |
| NF-SEC-06 | Security Requirements for Integration<br>External API interfaces should be accessible only to the authorized Token Requestor Entities that are registered in the system. |

Figure 7:
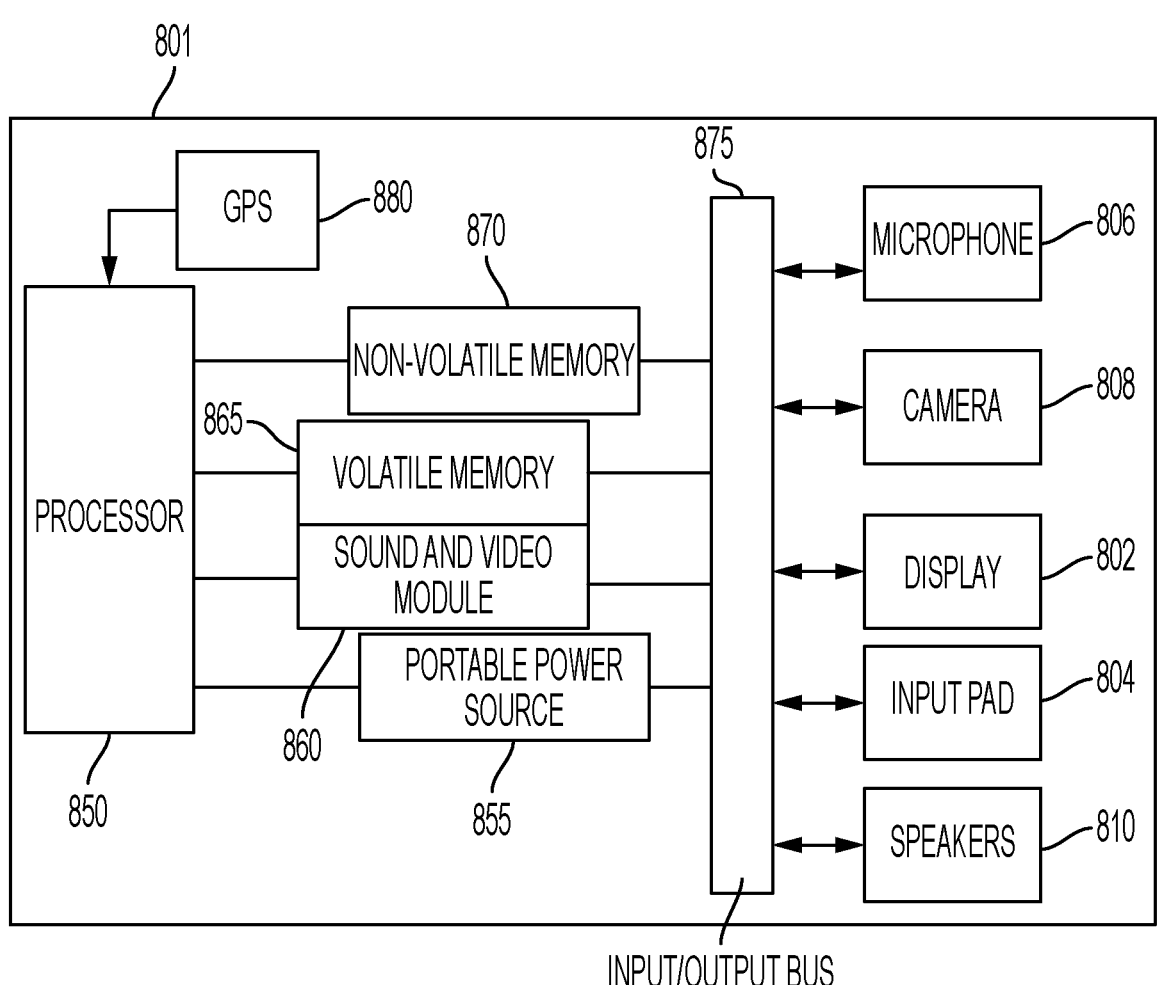
FIG. 7 is a diagram illustrating a portable computing device according to one embodiment of the invention.

FIG. 7 may be a high level illustration of a portable computing device 801 communicating with a remote computing device 841 but the application may be stored and accessed in a variety of ways. In addition, the application may be obtained in a variety of ways such as from an app store, from a web site, from a store Wi-Fi system, etc. There may be various versions of the application to take advantage of the benefits of different computing devices, different languages, and different API platforms.

In one embodiment, a portable computing device 801 may be a mobile device 112 that operates using a portable power source 855 such as a battery. The portable computing device 801 may also have a display 802 which may or may not be a touch sensitive display. More specifically, the display 802 may have a capacitance sensor, for example, that may be used to provide input data to the portable computing device 801. In other embodiments, an input pad 804 such as arrows, scroll wheels, keyboards, etc., may be used to provide inputs to the portable computing device 801. In addition, the portable computing device 801 may have a microphone 806 which may accept and store verbal data, a camera 808 to accept images and a speaker 810 to communicate sounds.

The portable computing device 801 may be able to communicate with a computing device 841 or a plurality of computing devices 841 that make up a cloud of computing devices 811. The portable computing device 801 may be able to communicate in a variety of ways. In some embodiments, the communication may be wired such as through an Ethernet cable, a USB cable or RJ6 cable. In other embodiments, the communication may be wireless such as through Wi-Fi (802.11 standard), Bluetooth, cellular communication or near field communication devices. The communication may be direct to the computing device 841 or may be through a communication network 102 such as cellular service, through the Internet, through a private network, through Bluetooth, etc. FIG. 7 may be a simplified illustration of the physical elements that make up a portable computing device 801 and FIG. 8 may be a simplified illustration of the physical elements that make up a server type computing device 841.

FIG. 7 may be a sample portable computing device 801 that is physically configured according to be part of the system. The portable computing device 801 may have a processor 850 that is physically configured according to computer executable instructions. It may have a portable power supply 855 such as a battery which may be rechargeable. It may also have a sound and video module 860 which assists in displaying video and sound and may turn off when not in use to conserve power and battery life. The portable computing device 801 may also have volatile memory 865 and non-volatile memory 870. It may have GPS capabilities 880 that may be a separate circuit or may be part of the processor 850. There also may be an input/output bus 875 that shuttles data to and from the various user input devices such as the microphone 806, the camera 808 and other inputs, such as the input pad 804, the display 802, and the speakers 810, etc. It also may control of communicating with the networks, either through wireless or wired devices. Of course, this is just one embodiment of the portable computing device 801 and the number and types of portable computing devices 801 is limited only by the imagination.

As a result of the system, better information may be provided to a user at a point of sale. The information may be user specific and may be required to be over a threshold of relevance. As a result, users may make better informed decisions. The system is more than just speeding a process but uses a computing system to achieve a better outcome.

Figure 8:
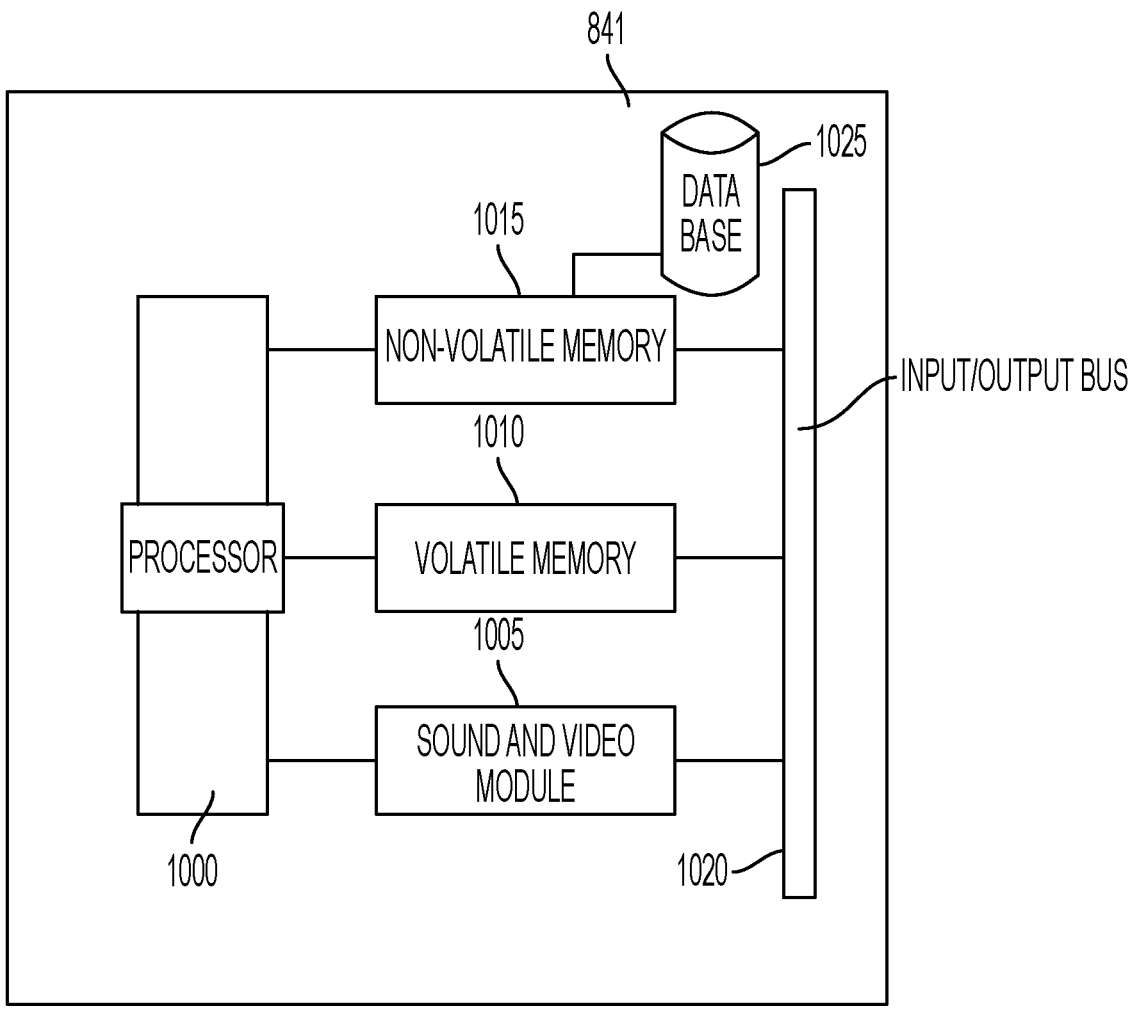
FIG. 8 is a diagram illustrating a remote computing device according to one embodiment of the invention.

The physical elements that make up the remote computing device 841 may be further illustrated in FIG. 8. At a high level, the computing device 841 may include a digital storage such as a magnetic disk, an optical disk, flash storage, non-volatile storage, etc. Structured data may be stored in the digital storage such as in a database. The server 841 may have a processor 1000 that is physically configured according to computer executable instructions. It may also have a sound and video module 1005 which assists in displaying video and sound and may turn off when not in use to conserve power and battery life. The server 841 may also have volatile memory 1010 and non-volatile memory 1015.

The database 1025 may be stored in the memory 1010 or 1015 or may be separate. The database 1025 may also be part of a cloud of computing device 841 and may be stored in a distributed manner across a plurality of computing devices 841. There also may be an input/output bus 1020 that shuttles data to and from the various user input devices such as the microphone 806, the camera 808, the inputs such as the input pad 804, the display 802, and the speakers 810, etc. The input/output bus 1020 also may control of communicating with the networks, either through wireless or wired devices. In some embodiments, the application may be on the local computing device 801 and in other embodiments, the application may be remote 841. Of course, this is just one embodiment of the server 841 and the number and types of portable computing devices 841 is limited only by the imagination.

The user devices, computers and servers described herein may be general purpose computers that may have, among other elements, a microprocessor (such as from the Intel Corporation, AMD, ARM, Qualcomm, or MediaTek); volatile and non-volatile memory; one or more mass storage devices (i.e., a hard drive); various user input devices, such as a mouse, a keyboard, or a microphone; and a video display system. The user devices, computers and servers described herein may be running on any one of many operating systems including, but not limited to WINDOWS, UNIX, LINUX, MAC OS, iOS, Android, or Windows (XP, VISTA, etc.). It is contemplated, however, that any suitable operating system may be used for the present invention. The servers may be a cluster of web servers, which may each be LINUX based and supported by a load balancer that decides which of the cluster of web servers should process a request based upon the current request-load of the available server(s).

The user devices, computers and servers described herein may communicate via networks, including the Internet, WAN, LAN, Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a harddrive or a floppy disk, or an optical medium such as a CD-ROM. Any such computer readable medium may reside on or within a single computational apparatus and may be present on or within different computational apparatuses within a system or network.

Figure 9:
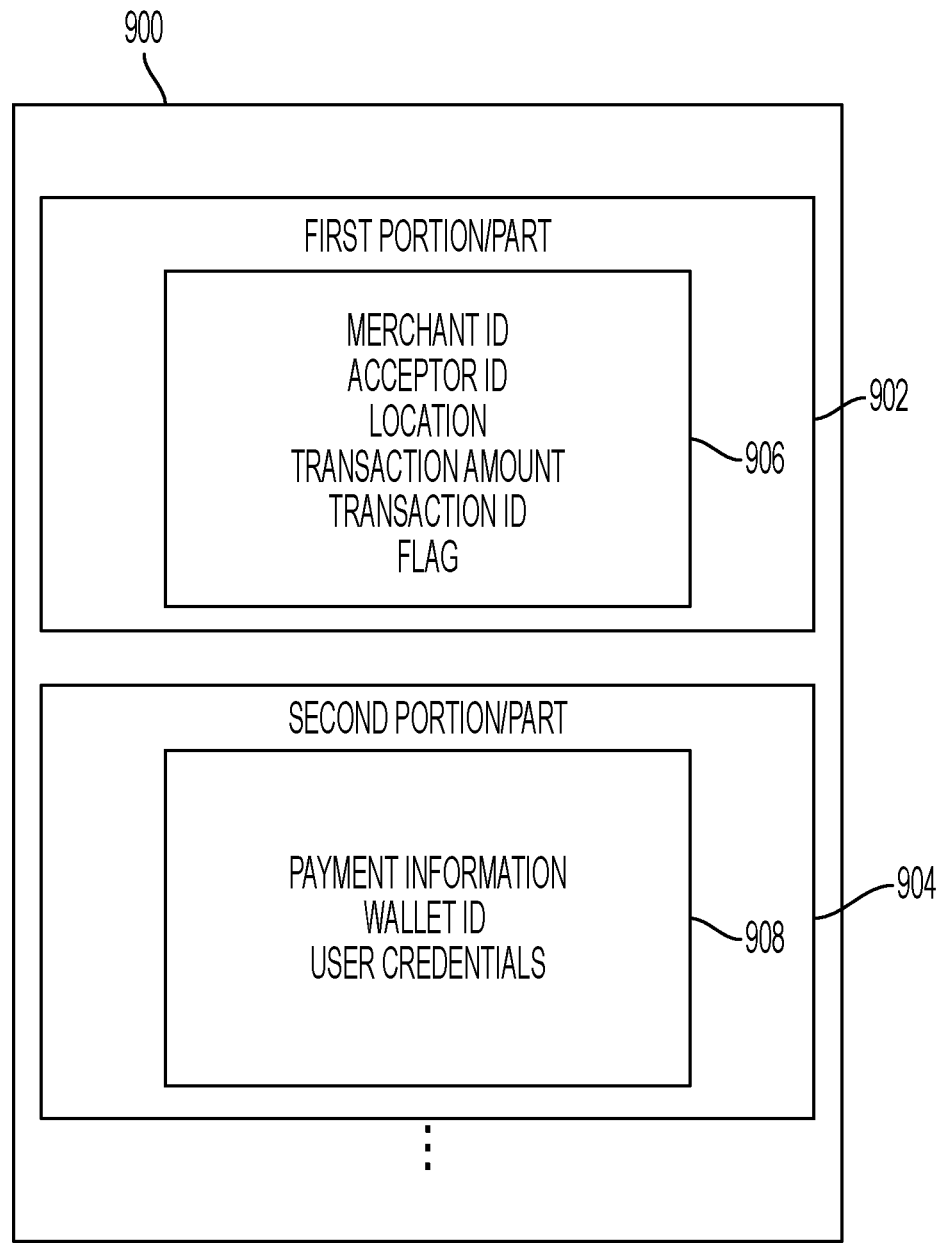
FIG. 9 is a diagram illustrating a data structure of a handle message of a two-dimensional code according to one embodiment of the invention.

FIG. 9 is a diagram illustrating a data structure 900 of the handle message to be included in the two-dimensional code. In one embodiment, the handle message may be tokenized or encrypted. The data structure 900, in one embodiment, may include a first part or portion 902. In one embodiment, the first portion of the handle message may include data fields 906 for storing data such as: a merchant ID, an acceptor ID, a location information, a transaction amount, a transaction ID, and a processing flag. In another embodiment, the data structure may include a second part or portion 904. The second part or portion 904 may include data fields 908 for storing payment information, wallet ID of a user, user credentials.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated.

The present disclosure provides a solution to the long-felt need described above. In particular, the systems and methods described herein may be configured for improving transaction data using two-dimensional code. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

What is claimed is:

1. A computerized method executable on a transaction server for processing a two-dimensional code transaction, the method comprising:

encoding merchant transaction data to a first part of a handle message, wherein the merchant transaction data comprises a merchant ID, an acceptor ID, a location information, a transaction amount, a transaction ID, and a processing flag;

generating a two-dimensional code embedding the first part of the handle message, said two-dimensional code to be scanned by an imaging device of a user;

receiving from a reader server an authorization request comprising the first part of the handle message and user payment data encoded to a second part of the handle message;

expanding and translating the handle message to a euro-card-mastercard-visa (EMV)-compliant transaction data payload comprising the merchant transaction data and the user payment data;

completing the two-dimensional code transaction based on the EMV-compliant transaction data payload;

wherein a storage capacity of the two-dimensional code prevents the EMV-compliant transaction data payload from being encoded directly to the two-dimensional code.

2. A computerized method for processing a two-dimensional code transaction, the method comprising:

receiving a request for generating a two-dimensional code from a user device to conduct a transaction;

encoding user payment data to a first part of a handle message, wherein the user payment data comprises a primary account number associated with a user;

generating the two-dimensional code for display on the user device, wherein the first part of the handle message is embedded in the two-dimensional code;

receiving an authorization request from a merchant, wherein the authorization request comprises the first part of the handle message and merchant transaction data encoded to a second part of the handle message, wherein the merchant transaction data comprises a merchant ID, an acceptor ID, a location information, a transaction amount, a transaction ID, and a processing flag;

expanding and translating the handle message to a euro-card-mastercard-visa (EMV)-compliant transaction data payload comprising the user payment data and the merchant transaction data; and completing the two-dimensional code transaction based on the EMV-compliant transaction data payload;

wherein a storage capacity of the two-dimensional code prevents the EMV-compliant transaction data payload from being encoded directly to the two-dimensional code.

3. The computerized method of claim 1, wherein the two-dimensional code comprises a quick response (QR) code or a barcode.

4. The computerized method of claim 2, wherein the two-dimensional code comprises a quick response (QR) code or a barcode.

5. A transaction server comprising a processor and a memory, wherein the memory stores instructions executable by the processor to:

receive a request for generating a two-dimensional code from a user device;

encode user payment data to a first part of a handle message, wherein the user payment data comprises a wallet user ID associated with a user;

generate the two-dimensional code for display by a wallet application installed on the user device, wherein the first part of the handle message is embedded in the two-dimensional code;

receive an authorization request from a merchant, wherein the authorization request comprises the first part of the handle message and merchant transaction data encoded to a second part of the handle message, wherein the merchant transaction data comprises a merchant ID, an acceptor ID, a location information, a transaction amount, a transaction ID, and a processing flag;

expand and translate the handle message to a eurocard-mastercard-visa (EMV)-compliant transaction data payload comprising the user payment data and the merchant transaction data; and complete the two-dimensional code transaction based on the EMV-compliant transaction data payload;

wherein a storage capacity of the two-dimensional code prevents the EMV-compliant transaction data payload from being encoded directly to the two-dimensional code.

6. The transaction server of claim 5, wherein the two-dimensional code comprises a quick response (QR) code or a barcode.

7. The computerized method of claim 1, wherein completing the two-dimensional code transaction based on the EMV-compliant transaction data payload comprises transmitting the EMV-compliant transaction data payload to an issuer.

8. The computerized method of claim 1, wherein completing the two-dimensional code transaction based on the transaction data payload comprises transmitting the merchant transaction data to an acquirer for verification.

9. The computerized method of claim 1, wherein encoding the merchant transaction data to the first part of the handle message comprises tokenizing the merchant transaction data.

10. The computerized method of claim 9, wherein expanding and translating the handle message to the EMV-compliant transaction data payload comprises detokenizing the the merchant transaction data.

11. The computerized method of claim 2, wherein completing the two-dimensional code transaction based on the EMV-compliant transaction data payload comprises transmitting the EMV-compliant transaction data payload to an issuer.

12. The computerized method of claim 2, wherein completing the two-dimensional code transaction based on the EMV-compliant transaction data payload comprises transmitting the merchant transaction data to an acquirer for verification.

13. The computerized method of claim 2, wherein encoding the user payment data to the first part of the handle message comprises tokenizing the user payment data.

14. The computerized method of claim 13, wherein decoding expanding and translating the handle message to the EMV-compliant transaction data payload comprises detokenizing the user payment data.

15. The transaction server of claim 5, wherein the instructions executable by the processor to complete the two-dimensional code transaction based on the EMV-compliant transaction data payload comprise instructions to transmit the EMV-compliant transaction data payload to an issuer.

* * * * *